United States Patent [19]

Pate

[11] 4,172,578
[45] * Oct. 30, 1979

[54] DEVICE FOR CLAMPING CONDUIT

[75] Inventor: Harold T. Pate, Cleveland, Ohio

[73] Assignee: Indian Head Inc., New York, N.Y.

[*] Notice: The portion of the term of this patent subsequent to Jul. 26, 1994, has been disclaimed.

[21] Appl. No.: 887,307

[22] Filed: Mar. 16, 1978

[51] Int. Cl.² .............................................. F16L 3/08
[52] U.S. Cl. ............................... 248/74 R; 24/73 SA; 248/74 PB
[58] Field of Search ............... 248/74 R, 74 B, 74 PB, 248/68 CB, 67.5, 54 R, 71; 24/257, 73 SA, 73 AP, 73 PB

[56] References Cited

U.S. PATENT DOCUMENTS

| | | | |
|---|---|---|---|
| 1,861,130 | 5/1932 | Mitchel | 248/74 B |
| 2,956,103 | 10/1960 | Steel et al. | 248/74 R X |
| 3,110,465 | 11/1963 | Sugarman et al. | 248/74 B |
| 3,144,695 | 8/1964 | Budwig | 248/74 PB X |
| 3,227,406 | 1/1966 | Shelton et al. | 248/54 R |
| 3,341,903 | 9/1967 | Buntic | 24/73 PB X |
| 3,564,676 | 2/1971 | Oeser | 248/74 R |
| 3,682,422 | 8/1972 | Evans | 248/68 CB |
| 3,982,304 | 9/1976 | Menshen | 248/68 CB X |
| 4,037,810 | 7/1977 | Pate | 248/74 PB X |

FOREIGN PATENT DOCUMENTS

| | | | |
|---|---|---|---|
| 1406523 | 6/1965 | France | 24/73 PB |
| 6589 | of 1911 | United Kingdom | 248/67.5 |
| 716309 | 9/1954 | United Kingdom | 248/74 R |
| 1147914 | 4/1969 | United Kingdom | 24/73 AP |
| 1226569 | 3/1971 | United Kingdom | 248/71 |

Primary Examiner—Rodney H. Bonck
Attorney, Agent, or Firm—William R. Laney

[57] ABSTRACT

A device for clamping conduit which includes a U-shaped body portion having a recess therein located between two legs of the body portion, and a toothed jaw portion positioned at the bottom of the recess for engaging a pipe or conduit. A clamping portion is hingedly secured to one of the legs of the body portion at the free end thereof by an integral flexible hinge, and is adapted to fold about the hinge to enclose the pipe or conduit in the recess by means of a second toothed jaw portion formed on the clamping portion. Each of the legs of the body portion carries a protuberant apertured flange with the apertures in the flanges positioned for alignment with corresponding apertures in the clamping portion when the clamping portion is pivoted to its recess closing position. The aligned apertures in the flanges and clamping portions can then be used for receiving fasteners extended through these apertures and into a supporting surface such as a wall or the like.

9 Claims, 7 Drawing Figures

DEVICE FOR CLAMPING CONDUIT

RELATED PATENTS

The subject matter of this application is related to that which is disclosed in my U.S. Pat. No. 4,037,810.

BACKGROUND OF THE INVENTION

1. Field of the Invention

This invention relates generally to pipe or conduit clamping and supporting structures, and more particularly, but not by way of limitation, to a conduit clamping structure which can be secured by one or a plurality of fastening devices extended through apertures provided for this purpose in the clamping device.

2. Description of the Prior Art

A number of types of pipe clamps or hangers have been developed for the purpose of supporting a pipe or conduit on a supporting surface such as a floor or ceiling. Some of such clamps or hanger structures have been made of metal and others of synthetic resin.

Clamps of the type described are frequently used for engaging thin walled copper or copper alloy pipe used for hot water service in various types of buildings. Plastic conduit as well as metallic conduit is also employed for cold water service and must be supported along a particular course which it is to occupy after installation. In such installations, one desideratum is to damp out bumping and knocking caused by pressure surges or other anomalies (sudden thermal differentials and the like) to prevent the sound from being transmitted to and through the materials across which the conduits and pipes carrying water may be extended.

One of the problems which is sometimes encountered where metallic clamping structures or supports are used for fixing the location of metallic conduit is that the possibility of galvanic action and electrolysis poses a problem of corrosion, particularly in those instances where the conduit or pipe is made of a metal which is dissimilar from the clamps used to hold such pipe or conduit in place. This is particularly true where metal screw fasteners come into contact with the metallic pipe or conduit as such fastening devices are used as a portion of the clamping system.

Another desideratum that exists where copper tubing is employed for conveyance of hot water is that of preventing the high thermal conductivity of the copper tubing from posing a safety problem, either through inadvertent touching by occupants of the structure in which the tubing is located, or by contact between the tubing and relatively flammable materials. In order to minimize the conduction of heat to the pipe supporting structure, it is desirable that a pipe clamping device or hanger be relatively non-conductive to heat and able to space the conduit or pipe which it supports away from a wooden supporting surface to which the clamping structure is secured.

Lastly, it is desirable that any type of clamping or pipe hanger structure which is used for locating the course of a system of conduit along a wall, floor or ceiling be able to accommodate expansion and contraction of the conduit by permitting some amount of linear movement of the pipe with respect to the clamping device.

SUMMARY OF THE PRESENT INVENTION

The present invention contemplates a conduit clamping device which comprises a relatively rigid synthetic resin body which is generally U-shaped in configuration and has a pair of substantially parallel legs which define between them, a conduit- or pipe-receiving recess. The legs are joined by an interconnecting portion or web which carries a fastener-receiving aperture midway between the legs. There is also positioned within the recess between the legs and adjacent the interconnecting portion, at least one arcuate jaw portion which bounds the recess between the legs and carries a plurality of circumferentially spaced, radially inwardly projecting teeth. The jaw portion is arced on a radius such that it is adapted to register with and engage a substantial portion of the periphery of a circularly cross-sectioned pipe or conduit placed within the U-shaped body and between the legs.

At the free ends of the two legs of the body portion and on the opposite sides thereof from their sides adjacent the recess therebetween, each of the legs carries an apertured flange. The apertures in these flanges are provided for receiving headed fasteners which can be used for securing the conduit clamping device to a wall or other surface upon which a conduit or pipe clamped thereby is to be supported.

Secured to one of the flanges is a hinge which hingedly connects to the flange and body, a clamping portion. The clamping portion generally comprises an elongated plate or panel having one of its transverse edge connected to the hinge and extending in the longitudinal sense from this hinge. The clamping portion is adapted to pivot on the hinge from a position in which it extends away from the body, to a position where it bridges across the two legs of the body and closes the recess. In this position, the clamping portion is effective for clamping or closing the pipe or conduit within the recess between the legs of the body.

The clamping portion carries, intermediate its length, at least one arcuate jaw portion which carries radially inwardly projecting teeth adapted to bear against and engage the outer peripheral surface of a cylindrical conduit or pipe placed within the recess in the body portion. At a location relatively near the hinge, the clamping portion carries an aperture which is positioned for alignment with the aperture through that one of the flanges to which the hinge is secured at a time when the clamping portion is in its closed position. The clamping portion also carries an aperture adjacent its free end (opposite that end thereof connected to the hinge), and this aperture is positioned for alignment with the aperture through the second of the flanges secured to the other leg of the body portion at a time when the clamping portion is in its closing status. With the clamping portion pivoted into its closing status where it extends across the legs and closes the recess therebetween, the apertures which are provided in the clamping portion, in being in alignment with the apertures through the two flanges portions, facilitate the extension of a pair of fastening devices through both these flanges and the clamping portion so that the clamping device can be secured to a wall or other supporting surface.

For the purpose of securing the clamping portion in its position of closure, the flange which is secured to the other of the two legs from that which carries the flange to which the hinge is secured has at least one peg-receiving cavity therein for receiving a locking peg carried on the clamping portion near its free end and adjacent the opening formed in this end of the clamping portion. When the clamping portion is closed, the locking peg is pressed into the described cavity, and by frictional or snap engagement, prevents the clamping portion from releasing to open the recess in the body.

An important object of the present invention is to provide a new and improved conduit clamping device through the use of which a conduit can be quickly and easily secured in a fixed location upon a wall or other supporting surface.

Another object of the present invention is to provide an improved conduit clamping device which is suitable for use in mounting copper and similar metallic tubing or conduit in a structure.

An additional object of the invention is to provide a clamping device which, by its construction, obviates or prevents contact between screws or nails, used to secure the clamping device to a wall or the like, and a conduit for pipe held at that location by means of the clamping device.

An additional object of the invention is to provide an integrally molded, unitary synthetic resin clamping device which has a quick-closing clamping portion which may be used to snap secure a pipe or conduit within the clamping device preparatory to securing the clamping device on a supporting surface.

Another object of the present invention is to provide an improved pipe or conduit clamp which is relatively inexpensive and simple to manufacture and install.

An additional object of the invention is to provide a pipe clamp which minimizes the possibility of electrolysis or galvanic action at the location of contact between the pipe and clamp, and minimizes sound and heat transmission from the pipe held therein to a building structure in which the clamp is used to support such pipe, and which securely holds the tubing, pipe or conduit while allowing for linear thermal expansion and contraction thereof.

Other objects and advantages of the invention will become apparent from the following detailed description of the invention when the same is read in conjunction with the accompanying drawings which illustrate the invention.

GENERAL DESCRIPTION OF THE DRAWINGS

DETAILED DESCRIPTION OF PREFERRED EMBODIMENTS OF THE INVENTION

Figure 1:
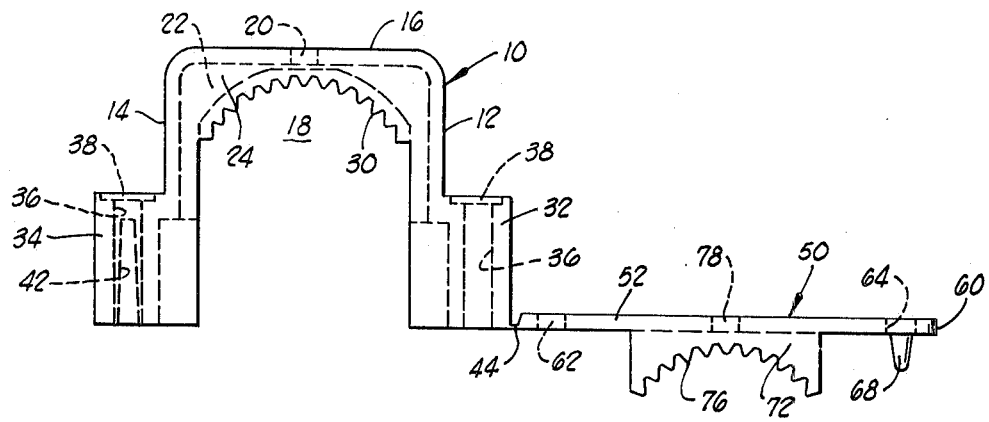
FIG. 1 is a side elevation view of one form of conduit clamping device constructed in accordance with the present invention.

In referring to the drawings, the embodiment of the conduit clamping device which is illustrated in FIGS. 1–5 will be noted to include a substantially U-shaped body portion 10 which includes a pair of opposed, spaced, substantially parallel legs 12 and 14. The legs 12 and 14 are joined by an interconnecting portion 16 which extends between the legs, and defines with the legs, a pipe-receiving recess 18.

Figure 2:
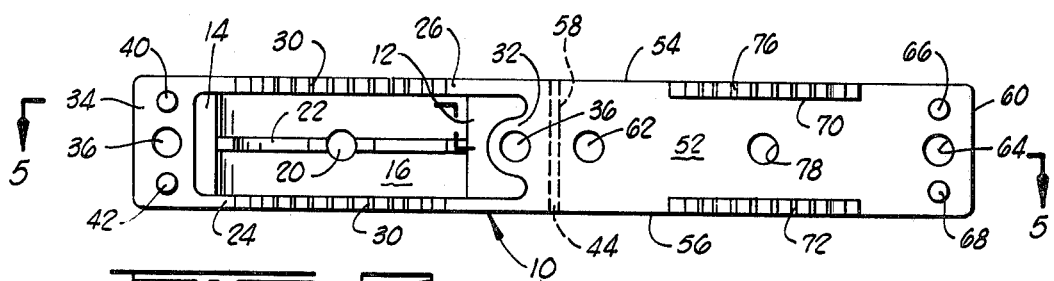
FIG. 2 is a bottom plan view of the conduit clamping device illustrated in FIG. 1.
Figure 3:
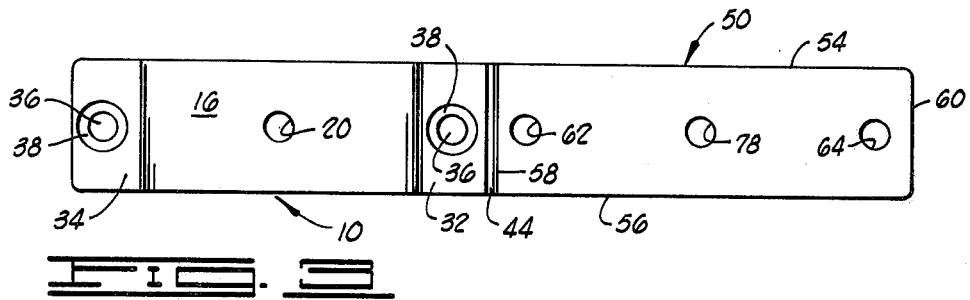
FIG. 3 is a top plan view of the conduit clamping device illustrated in FIG. 1.

In referring to FIG. 2, it will be noted that the interconnecting portion 16 is of significant transverse width, and that it is characterized in having a circular fastener aperture 20 formed through the central portion thereof. The fastener aperture 20 also registers with a reinforcing web 22 illustrated in dashed lines in FIG. 1 and in elevation in FIG. 2. The reinforcing web 22 is arcuate in configuration, having an inner surface or edge formed substantially on the circumference of a circle, and having a flat at the bottom thereof where the fastener opening 20 is located. The opposite ends of the web 22 are molded integrally with, and joined to, the legs 12 and 14 of the body 10 and provide support and reinforcement for the legs.

At the opposite side edges of the interconnecting portion 16, a pair of parallel, arcuate jaw portions 24 and 26 are provided. The jaw portion 24 is illustrated in elevation in FIG. 1, and both of the jaw portions 24 and 26 are shown in plan view in FIG. 2. Each of the jaw portions 24 and 26 extends between the legs 12 and 14 at its opposite ends, and one side edge of each jaw portion is preferably molded or formed integrally with the interconnecting portion 16. Each jaw portion 24 and 26 also carries a radially inner edge of arcuate configuration, and this edge supports or has formed thereon, a plurality of contiguous, radially inwardly extending teeth 30. The radially inner edges of the teeth 30 on each of the jaw portions 24 and 26 lie on the circumference of the circle which is approximately equivalent in dimension to the circular cross-section of a pipe or conduit which is to be placed within, and held by, the clamping device.

At its free end (or, stated differently, its end opposite that end which is joined to the interconnecting portion 16), each of the legs 12 and 14 carries a flange located on the opposite side of the leg from the recess 18. Thus, the leg 12 carries a flange 32 and the leg 14 carries a flange 34. Each of the flanges 32 and 34 has an aperture or bore 36 formed therethrough. These bores are shown in dashed lines in FIG. 1. Each of the bores 36 through the respective flanges 32 and 34 intersects at one end, a small counterbore 38 in which the head of a nail or other fastening device is countersunk when such fastening devices are used to secure the clamping device to a supporting surface in a manner hereinafter described.

The flange 34, in addition to the bore 36, carries a pair of frusto-pyramidally shaped recesses 40 and 42 which extend to a substantial depth in the flange, and are disposed on opposite sides of the opening or bore 36. This positional relationship is illustrated in FIG. 2 of the drawings.

Secured to an outer edge of the flange 32 and on the opposite side thereof from the side which is joined to the leg 12 is a hinge 44. In the preferred construction of the invention, the hinge 44 is a relatively thin strip of synthetic resin which is molded integrally with the flange 32, and also with a clamping portion, designated generally by reference numeral 50, which the hinge functions to movably join to the flange 32. The clamping portion 50 includes an elongated, substantially monoplanar plate or panel 52 of synthetic resin having a pair of opposed, substantially parallel longitudinal side edges 54 and 56, and an end edge 58 which is joined to the hinge portion 44, and an outer or free edge 60.

At a location near the hinge 44, the plate or panel 52 of the clamping portion 50 carries a hole or aperture 62 which is of a size and dimension corresponding to the configuration and dimension of the bore 36 formed in the flange 32. It will be noted from the following description that the location of the aperture 62 in the plate or panel 52 is such that when the clamping portion 50 is folded about the hinge 44 to a closure or clamping position, the aperture 62 is brought into alignment with the bore 36 in the flange 32. At the opposite end of the panel 52 and adjacent the free edge 60 thereof, a second circular aperture or hole 64 is formed through the panel, and is dimensioned to register with the bore 36 in the flange 34 when the clamping portion 50 is closed as hereinafter described.

The aperture 64 is disposed between a pair of generally conically shaped latching pegs 66 and 68. The latching pegs 66 and 68 are dimensioned to fit tightly within, and be frictionally engaged by, the cavities 40 and 42 formed in the flange 34 on opposite sides of the bore 36. A pair of arcuate jaw portions 70 and 72 are secured to the panel 52 adjacent the two longitudinal edges 54 and 56, and intermediate the length of these longitudinal edges. Each of the arcuate flanges 70 and 72 projects substantially normal to the plane of a panel 52 and, as best illustrated in FIG. 1, each of the flanges 70 and 72 carries at an arcuate edge spaced from the panel 52, plurality of contiguous teeth 76 which are disposed in arcuate array. The teeth 76 lie on the circumference of an imaginary circle which corresponds substantially in its circumferential dimension to the circular cross-section of a pipe or conduit to be placed within, and engaged by, the conduit clamping device. It will be noted in referring to FIG. 2 that the arcuate jaw portions 70 and 72 are in substantial alignment with the jaw portions 24 and 26 carried between the legs 12 and 14 of the body 10. As shown in FIGS. 1 and 2, a third circular hole or aperture 78 is disposed in the panel or plate 52 at a location whereby midway between the arcuate jaw portions 70 and 72.

Figure 4:
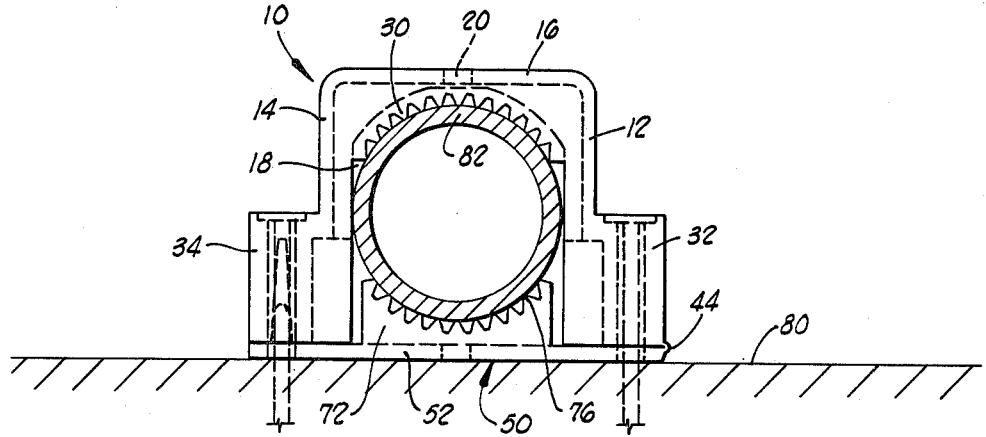
FIG. 4 is a side elevation view similar to FIG. 1, but showing the conduit clamping device in its clamping status with a conduit, illustrated in section, extending therethrough and clamped thereby, and illustrating, in dashed lines, a pair of fastening elements used to fasten the conduit clamping device to a wall.
Figure 5:
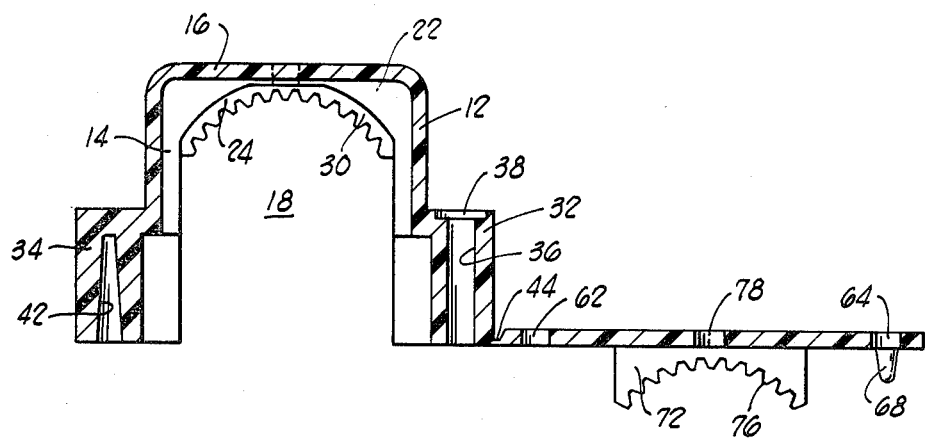
FIG. 5 is a sectional view taken along line 5—5 of FIG. 2.

The manner in which the conduit clamping device of the invention is utilized will be explained by referring to FIG. 4 of the drawings. The purpose, of course, of the clamping device is to permit a conduit or pipe to be firmly held thereby, and in this manner secured to a supporting surface such as a wall or the like. As has been previously explained, it is desirable in many instances to space the pipe or conduit from the supporting structure so that it does not come in contact therewith, and thus present a possible fire hazard, and does not directly transmit to such supporting surfaces, any sounds which may result from fluid surging within the pipe or conduit. The manner in which the clamping device cooperates with and engages a conduit at a time when it is secured to a wall is shown in FIG. 4. In this view of the drawings, a wall 80 is illustrated and the clamping device is being used to secure a conduit 82 to this wall. In accomplishing this function, the panel or plate 52 of the clamping portion 50 of the clamping device may first be placed on the wall 80 at the location where the conduit 82 is supported. The conduit 82 is then placed against the arcuate jaw portions 70 and 72 carried on the panel 52 so that its outer periphery bears against the teeth 76 thereof.

The body portion 10, including the legs 12 and 14 thereof and the flanges 32 and 34, is then folded about the hinge 44 so that the opposite side of the conduit 82 from that which is in contact with the arcuate jaw portions 70 and 72 of the clamping portion 50 is passed into and received by the recess 18 between the legs 12 and 14. Continued pivotation of the body 10 about the hinge 44 brings the flange 34 carried on the leg 14 thereof to a position such that the cavities 40 and 42 become aligned with, and frictionally receive, the locking pegs 66 and 68 carried adjacent the free end edge 60 of the panel 52 of the clamping portion 50.

When the body 10 has been folded around the conduit 82 to this position, the periphery of the conduit is in contact with the teeth 30 carried on the jaw portions 24 and 26. Also, at this time, the bore 36 through the flange 34 is placed in alignment with the opening 64 through the panel 52, and in similar fashion, the bore 36 through the flange 32 is placed in alignment with the circular opening 62 through the panel 52. With the clamping device and conduit thus oriented in relation to each other, a pair of fastening devices, such as nails 84, are passed through the bores 36, and the respective circular openings 62 and 64 with which the two bores are aligned. The counterbores 38 at the top side of the flanges 32 and 34 receive the heads of the nails and the shank of each of the nails is driven into the wall 80 to firmly secure the clamping device in its closed position, and mount it upon the wall with the conduit 82 securely clamped by the device.

It will be noted that when the conduit 82 is clamped in position within the clamping device, the contiguous teeth of the several jaw portions contact the periphery of the conduit at what are essentially a series of points. Good thermal insulation with respect to not only the wall upon which the conduit is mounted or supported, but also with respect to the major portion of the clamping device itself, is thereby obtained. Moreover, air circulation around the circuit through the space between the several teeth is permitted, and it is much easier for the conduit section within the clamp to slide or move longitudinally during thermal expansion and contraction as a result of the relatively small surface areas of contact with the conduit where the teeth touch the periphery thereof.

In an alternate method of mounting the conduit 82 at a desired location on a wall or other supporting surface, one or, in many instances, a plurality of the clamping devices can be clamped about the conduit, and then slid therealong until they are located in the spacing desired for supporting the conduit on the supporting structure. Both conduit and clamping devices are then moved to the location where the conduit is to run, and the clamping device is then secured against the wall or other supporting surface by means of nails or other fastening devices.

Finally, with some types of very heavy conduit of metallic construction, it may be desirable to extend yet a third fastening device into the wall 80, and this can be accomplished by passing the fastening device through the circular opening or aperture 28 disposed in the center of the panel 52 prior to positioning the conduit against the jaw portions 70 and 72, and enclosing it by folding the body 10 around and snapping it in its latched status.

Figure 6:
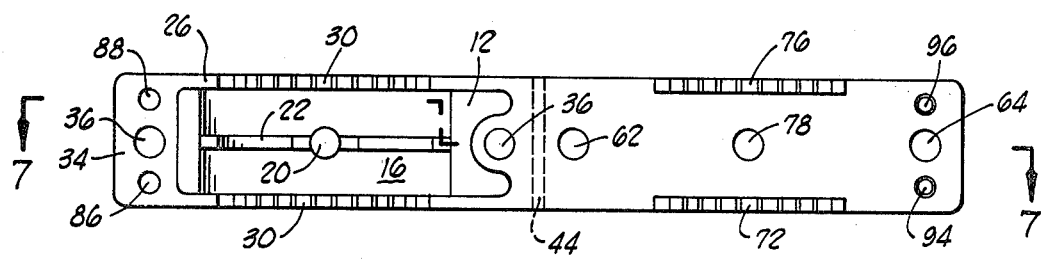
FIG. 6 is a bottom plan view of an alternate embodiment of the conduit clamping device of the invention.
Figure 7:
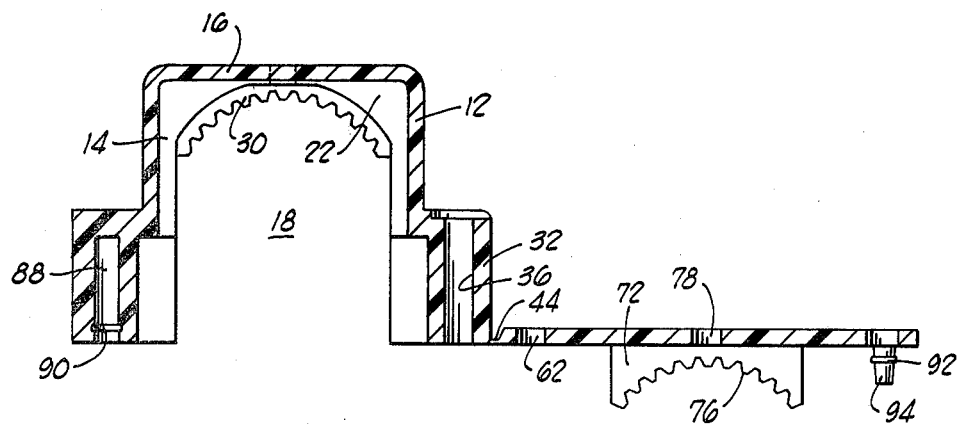
FIG. 7 is a sectional view taken along line 7—7 of FIG. 6.

An alternate embodiment of the invention is illustrated in FIGS. 6 and 7. Since a substantial portion of the structural elements making up the alternate embodiment are identical to the structural elements utilized in the embodiment depicted in FIGS. 1–5, identical reference numerals have been utilized to refer to identical elements in the two embodiments. In referring to FIG. 7, it will be noted that the cavities 86 and 88 which are provided for effecting snap engagement of the clamping portion 50 with the flange 34 are substantially rectangular in longitudinal cross-sectional configuration, rather than frustopyramidal as is characteristic of the cavities 40 and 42 in the earlier described embodiment. At the location where each of the cavities 86 and 88 opens at the outer face of the flange 34, each of these cavities is internally scribed or cut away to provide an annular groove 90 of semi-circular cross-section in the internal wall of the cavity. The annular grooves 90 in the respective cavities 86 and 88 function to interlock with and engage an arcuately cross-sectioned bead 92 carried on each of a pair of latching pegs 94 and 96 which replace the pegs 66 and 68 of the embodiment of FIGS. 1-5.

Although certain preferred embodiments of the invention have been herein described in order to afford an adequate illustration of the basic principles which underlie the invention to enable those skilled in the art to practice these principles and utilize the invention, it will be understood that various changes and innovations in the illustrated and described structures can be effected without departure from the basic principles which underlie the invention. Changes and innovations of the type are therefore believed to be within the spirit and scope of the invention, except as such scope may be necessarily limited by the appended claims or reasonable equivalents thereof.

What is claimed is:

1. A device for clamping a conduit comprising:
   a U-shaped body portion having a pair of substantially parallel legs, and having a recess therein between the two legs;
   at least one arcuate jaw portion positioned at the bottom of the recess between the two legs;
   a first protuberant, apertured flange secured to one of the body portion legs on the opposite side of said leg from said recess;
   a clamping portion hingedly connected to one of said flanges, having a pair of spaced apertures formed therethrough, and foldable to a closure position extending across said legs and closing said recess, with one of said apertures therethrough aligned with the aperture in said first protuberant flange;
   an arcuate jaw portion carried on said clamping portion and positioned thereon to project into said recess when said clamping portion is folded to said closure position extending across said legs;
   a second protuberant, apertured flange secured to the other of the body portion legs on the opposite side thereof from said recess and having an aperture therethrough aligned with a second of the apertures through said clamping portion; and
   means for latchingly engaging said clamping portion with one of said flanges.

2. A clamping device as defined in claim 1 wherein said means for latchingly engaging said clamping portion with said one of said flanges comprises:
   a cavity in said engaged flange; and
   a locking peg carried on, and projecting from, said clamping portion and dimensioned to frictionally engage said cavity.

3. A clamping device as defined in claim 1 wherein each of said arcuate jaw portions carries a plurality of arcuately arrayed contiguous teeth thereon oriented to face into said recess when said clamping portion is in its closure position.

4. A clamping device as defined in claim 1 wherein said body portion further includes an interconnecting portion extending between said legs and having an aperture extending through the central portion thereof.

5. A clamping device as defined in claim 1 wherein said means for latchingly engaging said clamping portion with said one of said flanges comprises:
   a pair of cavities in said engaged flange on the opposite sides of the aperture therein, and each having an annular groove extending around the internal wall of the cavity;
   a pair of locking pegs carried on, and projecting from, said clamping portions on the opposite sides of the aperture therethrough aligned with the aperture in said engaged flange; and
   an annular rib extending around each of said locking pegs and dimensioned to snap engage one of said annular grooves when the respective locking peg is inserted in one of said cavities.

6. A clamping device as defined in claim 5 wherein each of said arcuate jaw portions carries a plurality of arcuately arrayed contiguous teeth thereon oriented to face into said recess when said clamping portion is in its closure position.

7. A clamping device as defined in claim 6 wherein said body portion further includes an interconnecting portion extending between said legs and having an aperture extending through the central portion thereof.

8. A clamping device as defined in claim 7 wherein said device includes a pair of said first mentioned arcuate jaw portions positioned in said recess on opposite sides of the aperture through said interconnecting portion and extending parallel to each other, and said device further includes a reinforcing web positioned between said pair of first mentioned jaw portions, and extending between and joined to said legs.

9. A device for clamping a conduit comprising:
   a U-shaped body portion having
      a pair of spaced legs;
      a centrally apertured interconnecting portion extending between and joining said legs and defining therewith a pipe-receiving recess;
      a pair of spaced jaw portions joined to said interconnecting portion at locations on opposite sides of the aperture in said interconnecting portion and joined to said legs for engaging a pipe positioned between said legs in said recess, and for spacing the pipe engaged thereby from said interconnecting portion and the aperture therein whereby the pipe engaged by said jaw portions is spaced from the head of a fastening member extended through the aperture in said interconnecting portion; and
      a pair of apertured flange portions on the opposite sides of each of said legs from said recess;
   flexible hinge means connected to one of said flanges; and
   a clamping portion connected to said hinge means for pivotation on said body portion from an open position to a closure position closing said recess and extending across said apertured flange in a plane substantially parallel to the plane of said interconnecting portion whereby said conduit clamping device includes two flat surfaces on the opposite sides thereof as defined by said interconnecting portion and said clamping portion, said clamping portion including a pair of spaced apertures positioned therein for alignment with the apertures in said apertured flange portions when said clamping portion is in its closure position whereby a pair of fastening members may be extended through the aligned apertures in said flange portions and the apertures in said clamping portion in a direction substantially normal to the plane in which said clamping portion extends in its closure position;

a third aperture positioned between said first-mentioned pair of spaced apertures therein for alignment with the aperture in said interconnecting portion when said clamp portion is in its closure position and extends substantially parallel to said interconnecting portion whereby a fastening device for fastening said clamp to a supporting structure can optionally be extended through said aperture in said centrally apertured interconnecting portion or, in the opposite direction, through said second aperture in said clamping portion; and a pair of spaced jaw portions secured to said clamping portion on opposite sides of said third aperture in said clamping portion and projecting into said recess for cooperation with said first-mentioned jaw portions when said clamping portion is in its closure position and a pipe is positioned in said recess and engaged by said first-mentioned and second-mentioned jaw portions, said pair of spaced jaw portions secured to said clamping portion spacing a pipe engaged thereby from the second aperture therein and from a fastening member extended through said second aperture.

* * * * *